United States Patent [19]

Takeda et al.

[11] 4,284,541

[45] Aug. 18, 1981

[54] HOT-MELT PRESSURE SENSITIVE ADHESIVE COMPOUND

[75] Inventors: Masami Takeda, Iwakuni; Riichiro Nagano, Yamaguchi, both of Japan

[73] Assignee: Mitsui Petrochemical Industries, Ltd., Tokyo, Japan

[21] Appl. No.: 93,497

[22] Filed: Nov. 13, 1979

[30] Foreign Application Priority Data

Nov. 14, 1978 [JP] Japan ................................ 53-139358

[51] Int. Cl.$^3$ ........................ C08L 51/04; C08L 51/06
[52] U.S. Cl. ............................. 260/27 R; 260/27 BB; 260/33.6 AQ; 260/42.46; 260/45.95 R; 525/73; 525/74; 525/75; 525/78; 525/80; 525/84; 525/193; 525/285; 525/386

[58] Field of Search ................ 525/193, 74, 285, 332, 525/386, 75, 78, 80; 260/27 R

[56] References Cited

U.S. PATENT DOCUMENTS 3,868,433  2/1975  Bartz et al. .......................... 525/193

Primary Examiner—Carman J. Seccuro
Attorney, Agent, or Firm—Cushman, Darby & Cushman

[57] ABSTRACT

A hot-melt compound comprising 30 to 70% by weight of a modified ethylene.α-olefin copolymer rubber having a melt index of at most 500 and prepared by grafting an unsaturated carboxylic acid or derivative thereof to an ethylene.α-olefin copolymer rubber or a partial ester of said modified copolymer rubber and 70 to 30% by weight of a tackifier.

22 Claims, No Drawings

HOT-MELT PRESSURE SENSITIVE ADHESIVE COMPOUND

This invention relates to a hot-melt compound, and more particularly to a hot-melt pressure sensitive adhesive compound including modified ethylene.α-olefin copolymer rubber prepared by grafting unsaturated carboxylic acid to ethylene.α-olefine copolymer rubber.

A known pressure sensitive adhesive used as, for example, an adhesive tape is generally formed of elastomers such as polyisoprene, styrene butadiene rubber, butyl rubber, polyisobutylene, chloroprene rubber, polyacrylic ester, and polyvinyl ether; tackifier such as rosin or derivatives thereof, terpene resin, petroleum resin, and cumarone-indene resin; and, if necessary, additives such as softener, filler and age resistor. Almost all of the above-listed adhesives are first dissolved in an organic solvent and then applied to a support member. In recent years, it is demanded to eliminate an organic solvent from the product adhesive from the stand point of controlling environmental pollution and improving work, environments. From this point of view, growing demand is made for manufacture of hot-melt pressure sensitive adhesives without using an organic solvent, and such hot-melt pressure sensitive adhesives have come to be used in increasing amounts.

The property of pressure sensitive adhesives has hitherto been evaluated by three factors: (a) tackiness; (b) adhesion (peel strength); and (c) holding power (shear adhesion). In addition to these three factors, good applicability is further demanded of the hot-melt pressure sensitive adhesive when it is melted.

Pressure sensitive adhesive used at present which practically satisfy the above-mentioned requirements include pressure sensitive adhesives mainly consisting of elastomers such as styrene-isoprene-styrene block copolymer rubber (SIS), styrene-butadiene-styrene block copolymer rubber (SBS). However, these adhesives have the drawbacks that they have low heat resistance and low weatherability and are moreover expensive.

This invention has been accomplished in view of the aforesaid circumstances and is intended to provide a hot-melt compound which is free from the difficulties encountered in the prior art hot-melt pressure sensitive adhesive and displays significantly improved properties. A hot-melt compound according to this invention comprises 30 to 70% by weight of a modified ethylene.α-olefin copolymer rubber having a melt index of at most 500 and prepared by grafting an unsaturated carboxylic acid or derivative thereof to an ethylene.α-olefin copolymer rubber or a partial ester of said modified copolymer rubber and 70 to 30% by weight of a tackifier.

The hot-melt compound of this invention is superior to the conventional product in all the factors of tackiness, adhesion and holding power, and offers the advantage of being applicable by the ordinary painting device for hot-melt pressure sensitive adhesive. Further, the present hot-melt compound excels over the known hot-melt pressure sensitive adhesives whose elastomer component consists of SIS or SBS in respect of heat resistance and aging resistance.

Modified ethylene.α-olefin copolymer rubber used as the elastomer component of a hot-melt compound embodying this invention has a melt index (MI) of at most 500 as measured at 230° C. (tested in pursuance of ASTM-D-1238-65T). A hot-melt compound including modified ethylene.α-olefin copolymer rubber having a melt index exceeding 500 is decreased in adhesion and holding power.

When a hot-melt compound embodying this invention is applied as a hot-melt pressure sensitive adhesive compound, the modified ethylene.α-olefin copolymer rubber is chosen to have a melt index of 5 to 500, preferably 10 to 200, more preferably 20 to 100. Modified ethylene.α-olefin copolymer rubber having a lower melt index than 5 is reduced in fluidity. If a hot-melt compound containing such copolymer rubber is applied as a pressure sensitive adhesive, then the resultant compound undesirably presents difficulties in application and workability.

The ethylene.α-olefin copolymer rubber used in this invention should be substantially saturated. Specifically, the amount of polyene such as diene and triene, if contained in the polymer chain, is preferably chosen to be at most 0.5 mol %. Suppose a modified rubber is prepared from an ethylene series copolymer rubber rich in unsaturated bonds such as ethylene-propylene-diene terpolymer rubber (EPDM) available on the market. In this case, the modified rubber is high in gel content and low in fluidity even under high temperatures, resulting in that it is difficult to coat a support member with the modified rubber. It follows that a copolymer rubber rich in unsaturated bonds is unsuitable for use as a raw material of the modified copolymer rubber, when a compound of this invention is applied as a pressure sensitive adhesive compound.

The ethylene content of the ethylene.α-olefin copolymer rubber is preferably chosen to be between 40 and 85 mol %, more preferably, between 60 and 83 mol %. Materials suitable for use as the α-olefin component of the copolymer rubber include, for example, propylene, 1-butene, and 4-methyl-1-pentene. Particularly suitable are propylene and 1-butene. The use of a crystalline ethylene.α-olefin copolymer rubber containing more than 85 mol % of ethylene as a starting material of a modified copolymer rubber renders the resultant compound unsatisfactory in tackiness. On the other hand, the use of an ethylene.α-olefin copolymer rubber containing less than 40 mol % of ethylene as a starting material of a modified rubber renders the resultant compound unsatisfactory in holding power.

In this invention, an unsaturated carboxylic acid or a derivative thereof is grafted to the ethylene.α-olefin copolymer rubber so as to provide a modified copolymer rubber acting as an elastomer component of the compound. Unsaturated carboxylic acids used in this invention include, for example, acrylic acid, methacrylic acid, maleic acid, fumaric acid and itaconic acid. Derivatives such as anhydrides, esters, amides, imides and metal salts of unsaturated carboxylic acid can also be used in this invention. Specifically, the derivatives used in this invention include, for example, maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monoethyl fumarate, dimethyl fumarate, monomethyl itaconate, diethyl itaconate, acrylamide, methacrylamide, maleic acid monoamide, maleic acid diamide, maleic acid-N-monoethylamide, maleic acid-N, N-diethyl amide, maleic acid-N-monobutyl amide, amleic acid-N, N-dibutyl amide, fumaric acid monoamide, fumaric acid diamide, fumaric acid-N-monoethylamide, fumaric acid-N, N-diethylamide, fumaric acid-N-monobutyl amide, fumaric acid-N, N-dibutylamide, maleimide, N-butyl maleimide, N-phenyl maleimide, sodium acrylate, sodium methacrylate, potassium acrylate, and potassium methacrylate. Among these materials, an unsaturated dicarboxylic acid or an anhydride thereof is preferred in this invention because the modified rubber is enabled to exhibit excellent properties. Particularly, maleic anhydride is most preferred in this invention.

In this invention, a modified copolymer rubber prepared by grafting an unsaturated carboxylic acid or an anhydride thereof to an ethylene.α-olefine copolymer rubber may be partially esterified. The esterification rate should be at most 80 mol % relative to the unsaturated carboxylic acid or the anhydride thereof. The alcohol used for the partial esterification is selected from aliphatic, alicylic or aromatic alcohols having 1 to 20 carbon atoms. Aliphatic alcohols particularly suitable for this invention are aliphatic monoalcohols such as methyl alcohol, ethyl alcohol, propanol, butanol, and ethylene glycol monoether. On the other hand, cyclohexanol and benzyl alcohol are preferred examples of the alicyclic and aromatic alcohols, respectively.

The unsaturated carboxylic acid or derivative thereof can be grafted to the ethylene.α-olefin copolymer rubber by known methods. For example, the grafting can be carried out by heating at a high temperature a mixture of the copolymer rubber and the graft monomer in the presence or absence of a solvent and a free-radical initiator. The amount (% by weight based on the copolymer rubber) of the monomer grafted to the copolymer rubber (hereinafter referred to as the rate of grafting) is preferably chosen to be between 0.01 and 10% by weight, more preferably, between 1 and 5% by weight. The copolymer rubber may be grafted partially or entirely. If the rate of grafting mentioned above is less than 0.01% by weight, the resultant compound is rendered inferior in tackiness and holding power. On the other hand, the rate of grafting exceeding 10% by weight causes the produced compound to be low in fluidity, resulting in that it is difficult to coat a support member with the compound. It follows that the rate of grafting exceeding 10% by weight is unsuitable for use as the modified copolymer rubber when a compound of this invention is applied as a pressure sensitive adhesive compound.

Materials suitable for use in this invention as a tackifier include, for example, aromatic, aliphatic, alicyclic or copolymer type petroleum resin, terpene resin, rosin and derivatives thereof, and cumarone-indene resin. The patroleum resin mentioned above represents a resinous material obtained by polymerizing a mixture of unsaturated compounds obtained as by-product in cracking or refining petroleum. The resinous material may be hydrogenated or modified with acid for use in this invention. The mixture of unsaturated compounds is preferably provided by a petroleum fraction having a boiling point ranging between −30° C. and +50° C. and consisting essentially of aliphatic hydrocarbons, or by a fraction having a boiling point ranging between 100° and 300° C. and consisting essentially of aromatic hydrocarbons.

The aliphatic petroleum resin particularly suitable for this invention should have about 70° to 130° C. of softening point as determined by ring and ball method, about 20 to 60 of bromine number and about 700 to 3,000 of average molecular weight as determined by vapor pressure osmometry method. The aliphatic petroleum resin meeting these properties can be obtained by polymerizing olefines and diolefins in the $C_4$ and $C_5$ fractions containing unsaturated hydrocarbons which are obtained as by-product in cracking or refining petroleum. The polymerization is carried out in general at −15° C. to +100° C. in the presence of a Friedel-Craft catalyst. The unsaturated hydrocarbon mixture may contain alicyclic hydrocarbons.

The aromatic petroleum resin particularly suitable for this invention should have about 70° to 150° C. of softening point as determined by ring and ball method and about 5 to 70 of bromine number. The resin can be prepared by polymerizing a petroleum fraction rich in $C_9$ vinylaromatic compounds, which is obtained as by-product in cracking or refining petroleum, in the presence of a Friedel-Craft catalyst.

The alicyclic petroleum resin used in this invention represents a polymer of cyclopentadiene, dicyclopentadiene, cumarone, indene, etc. or a polymer obtained by polymerizing a petroleum fraction rich in these alicyclic hydrocarbons. The cumarone-indene resin used in this invention represents a polymer of cumarone and/or indene obtained by polymerizing a cumarone, indene or mixture thereof. The suitable alicyclic petroleum resin or cumarone-indene resin should have about 50° to 150° C. of softening point as determined by ring and ball method, about 500 to 3,000 of molecular weight as determined by vapor pressure osmometry method and about 5 to 70 of bromine number.

The copolymer type petroleum resin used in this invention can be obtained by copolymerization reaction in the presence of a Friedel-Craft catalyst between a fraction rich in $C_4$ or $C_5$ aliphatic hydrocarbons and another fraction rich in $C_9$ vinylaromatic hydrocarbons.

Petroleum resins available on the market can be used in this invention. Specifically, it is possible to use an aliphatic petroleum resin available on the market under the trade name of Escolez (produced by Esso Chemical Co., Ltd.), Hirez (produced by Mitsui Petrochemical Industries, Ltd.), Quinton (produced by Nippon Zeon Co., Ltd.), or Wing Tack (produced by Goodyear Co., Ltd.). The aromatic petroleum resin used in this invention is available on the market under the trade name of Neopolymer (produced by Nippon Petrochmicals Co., Ltd.), Petrosin (produced by Mitsui Petrochemical Industries, Ltd.) or Klyrvel (produced by Velsicol Chemical Co., Ltd.). Further, it is possible to use Toho Hiresin (trade name of a copolymer type petroleum resin produced by Toho Chemical Industrial, Co., Ltd.), Alcon (trade name of an alicyclic petroleum resin produced by Arakawa Chemical Industries, Ltd.) or Escoleg 5,000 series (trade name of alicyclic petroleum resins produced by Esso chemical Co., Ltd.).

The terpene resin used in this invention represents a homopolymer or copolymer of terpenes such as pinene, terpinene and limonene. It is also possible to use a synthetic polyterpene resin obtained from a petroleum fraction. The suitable terpene resin should have about 70° to 130° C. of softening point as determined by ring and ball method, about 500 to 2,000 of molecular weight as determined by vapor pressure osmometry method and about 5 to 70 of bromine number.

The rosin and derivative thereof used in this invention include, for example, natural rosin, rosin ester and rosin modified with carboxylic acid.

Among the tackifiers described above, the terpene resin or aliphatic petroleum resin is particularly excellent in pressure sensitivity property and, thus, is most preferred in this invention.

Further, it is possible to use as tackifier a modified resin prepared by grafting an unsaturated carboxylic acid to a petroleum resin such as, an aromatic, copolymer type or aliphatic petroleum resin. The modified resin enables the hot-melt pressure sensitive adhesive to be free from color fading under high temperatures and to exhibit an improved pressure sensitive property.

The hot-melt compound of this invention should contain 30 to 70% preferably 40 to 60% by weight of the modified ethylene.α-olefin copolymer rubber based on the total amount of the modified copolymer rubber and the tackifier. If the amount of the rubber does not fall within the range mentioned above, the hot-melt compound fails to exhibit a satisfactory adhesion.

It should also be noted that ethylene-vinylacetate copolymer and/or wax can be added to the hot-melt compound of this invention so as to provide a hot-melt adhesive compound for bonding for example, shoe bottom, woodwork, etc., thereby expanding the field of use of the compound.

Further, at least one compounding agent selected from the group consisting of a softener, antioxidant, ultraviolet absorber, filler, etc., which are added to an ordinary pressure sensitive adhesive, can be added, as desired, to the hot-melt compound of this invention besides the other components described above. The softener, which serves to improve the flexibility and fluidity of the compound, is provided by petroleum fractions of high boiling point such as mineral oil, for example, paraffinic process oil, naphthenic process oil, aromatic process oil, liquid paraffin, white oil and petrolatum as well as by vegetable oils such as castor oil, cotton seed oil, linseed oil, and rape seed oil. A mineral oil, particularly, naphthenic process oil is well compatible with the elastomer component of the compound, enables the compound to exhibit excellent properties and, thus, is preferred in this invention. The amount of the softener should be at most 50% by weight based on the sum of the elastomer component and the tackifier. If the amount of the softener is larger than 50% by weight, the hot-melt compound fails to exhibit a satisfactory adhesion and holding power.

The other compounding agents added to the hot-melt compound include, for example, an antioxidant such as phenolic compounds and sulfur-containing compounds; an ultraviolet absorber such as salicylic acid derivatives, benzophenones, and benzotriazoles; and loading materials such as calcium carbonate, glass beads, cracked stone, zinc white, carbon black and silica.

The hot-melt compound of this invention can be prepared by melting and kneading in a kiln a mixture of the components described above. Further, a nozzle, roll coating machine, etc. can be used for coating the hot-melt compound thus prepared.

Described in the following are Examples of this invention. Throughout the Examples, the properties of the hot-melt compound such as tackiness were determined by the methods indicated below;
1. Tackiness: Rolling ball method (J. Dow method)
2. Adhesion: 180° peeling method (JIS Z-1523)
3. Holding power: The produced adhesive film was stuck to a stainless steel plate designated in JIS with 1 kg of load applied to the film the sticking area being 15×25 mm, and the distance of the film displacement was measured two hours later.

EXAMPLE 1

10 kg of ethylene-propylene copolymer rubber containing 80.5 mol % of ethylene units and having 28 of melt index, hereinafter referred to as "EPR-1", 300 g of maleic anhydride powder passing 60 meshes, and 14.3 g of an organic peroxide, i.e., 2,5-dimethyl-2,5-di(tert-butylperoxy) hexyne-3, were uniformly mixed under nitrogen atmosphere. The mixture was extruded at a resin temperature of 250° C. by using an extruder having a diameter of 40 mm and equipped with a dulmage screw so as to obtain pelletized extrudate. The length to diameter ratio(L/D) of the extruder was 28. The extrudate was washed with acetone so as to remove the unreacted monomers, thereby obtaining maleic anhydride-modified ethylene-propylene copolymer rubber having a melt index of 8.5 and containing 2.5% by weight of maleic anhydride units, hereinafter referred to as "MAH-EPR-1".

Then, a pressure sensitive adhesive compound was prepared by kneading for 2 hours at 150° to 170° C. a mixture consisting of 100 parts by weight of MAH-EPR-1, 100 parts by weight of "YS Resin P-1000", (tradename of terpene resin produced by Yasuhara Fat and Oil Co., Ltd.), 50 parts by weight of "Sun Oil 410" (trade name of naphthenic process oil produced by Sun Oil Co., Ltd., USA) and 2 parts by weight of 2,6-di-tert-butyl-p-cresol acting as antioxidant. The compound was melted at 180° C. and biaxially oriented polyethylene terephthalate film disposed on a hot plate of 180° C. was coated with the resultant hot-melt pressure sensitive adhesive compound by using an applicator the coating layer being 40μ thick, so as to prepare an adhesive film. Table 1 presented later shows the pressure sensitive properties of the adhesive film.

EXAMPLE 2

Maleic anhydride-modified ethylene-propylene copolymer rubber having a melt index of 16 and containing 1.8% by weight of maleic anhydride units, hereinafter referred to as "MAH-EPR-2", was prepared as in Example 1, except that the amount of maleic anhydride used was 220 g. Then, an adhesive film was prepared as in Example 1, except that MAH-EPR-2 mentioned above was used as the elastomer component. Table 1 shows the pressure sensitive properties of the adhesive film.

EXAMPLE 3

A reaction vessel charged in advance with 1 l of p-xylene was charged with 200 g of ethylene-propylene copolymer rubber having a melt index of 16 and containing 80 mol % of ethylene units, followed by purging the reaction vessel with nitrogen and, subsequently, heating the system to 140° C. so as to dissolve the copolymer rubber completely in the p-xylene. Then, 24.5 g of maleic anhydride and 1.35 g of dicumylperoxide dissolved in p-xylene were separately dripped into the reaction vessel over a period to 4 hours. The reaction system was kept stirred for 2 hours after completion of the dripping for carrying out the reaction, followed by cooling the reaction mixture to a room temperature. Then, the reaction mixture was poured into acetone so as to precipitate the polymer formed by the reaction, followed by washing the polymer with acetone so as to obtain a purified polymer of crumb-like appearance. The polymer was found to be maleic anhydride-modified ethylene-propylene copolymer rubber having a melt index of 7 and containing 3.2% by weight of maleic anhydride units, hereinafter referred to as "MAH-EPR-3".

Finally, an adhesive film was prepared as in Example 1, except that MAH-EPR-3 was used as the elastomer component. Table 1 shows the pressure sensitive properties of the adhesive film.

Control 1

An adhesive film was prepared as in Example 1, except that EPR-1, which was not modified, was used in place of the modified copolymer rubber of MAH-EPR-1 used in Example 1. Table 1 shows the pressure sensitive properties of the adhesive film.

Control 2

An adhesive film was prepared as in Example 1, except that Kraton TR-1107, (tradename of SIS produced by Shell Chemical Co., Ltd.) was used in place of MAH-EPR-1 used in Example 1. Table 1 shows the pressure sensitive properties of the adhesive film.

resin used in Example 1. Table 2 shows the pressure sensitive properties of the adhesive film.

EXAMPLE 6

An adhesive film was prepared as in Example 4, except that the amount of the terpene resin as tackifier was 60 parts by weight in stead of 100 parts by weight. Table 2 shows the pressure sensitive properties of the adhesive film.

Control 3

An adhesive film was prepared as in Example 4, except that the amount of the terpene resin as tackifier was 30 parts by weight. Table 2 shows the pressure sensitive properties of the adhesive film.

Control 4

An adhesive film was prepared as in Example 4, except that the amount of MAH-EPR-1 was 30 parts by weight in stead of 100 parts by weight. Table 2 shows the pressure sensitive properties of the adhesive film.

TABLE 2

| | | Example 4 | Example 5 | Example 6 | Control 3 | Control 4 |
|---|---|---|---|---|---|---|
| Component parts by weight | MAH-EPR-1 | 100 | 100 | 100 | 100 | 30 |
| | Terpene resin | 100 | — | 60 | 30 | 100 |
| | Hirez T-100X | — | 100 | — | — | — |
| | Softener | — | 50 | — | — | — |
| | Antioxidant | 2 | 2 | 2 | 2 | 2 |
| Pressure Sensitive properties | Tackiness (the number of balls | 8 | 10 | 10 | 6 | 8 |
| | Adhesion (g/25mm) | 2000 | 1800 | 1300 | 250 | 1000 |
| | Holding power (mm/2hours) | 0.1 | 0.1 | 0.2 | >1.0 | 0.6 |

TABLE 1

| | Elastomer | Pressure Sensitive Properties | | |
|---|---|---|---|---|
| | | Tackiness (the Number of balls) | Adhesion (g/25mm) | Holding power (mm/2hrs.) |
| Example 1 | MAH-EPR-1 | 12 | 1500 | 0.1 |
| Example 2 | MAH-EPR-2 | 11 | 2300 | 0.1 |
| Example 3 | MAH-EPR-3 | 10 | 2000 | 0.1 |
| Control 1 | EPR-1 | 3 | 1800 | 0.4 |
| Control 2 | SIS | 12 | 2100 | 0.2 |

EXAMPLE 4

An adhesive film was prepared as in Example 1, except that the pressure sensitive adhesive compound did not contain the naphthenic process oil. Table 2 shows the pressure sensitive properties of the adhesive film.

EXAMPLE 5

An adhesive film was prepared as in Example 1, except that Hirez T-100X (trade name of aliphatic petroleum resin produced by Mitsui Petrochemical Industries, Ltd.) was used as tackifier in place of the terpene

EXAMPLES 7 TO 9

Ethylene-propylene copolymer rubber having a melt index of 16 and containing 80 mol % by ethylene units was reacted with different kinds of unsaturated carboxylic acid as in Example 3 so as to prepare unsaturated carboxylic acid-modified ethylene-propylene copolymer rubber. Table 3 shows the properties of the modified rubber.

Then, a pressure sensitive adhesive compound was prepared by kneading for 2 hours at 150° to 170° C. a mixture consisting of 100 parts by weight of the modified rubber, 100 parts by weight of YS Resin P-1000 (trade name of terpene resin produced by Yasuhara Fat and Oil Co., Ltd.), 80 parts by weight of Sun Oil 410 (trade name of naphthenic process oil produced by Sun Oil Co., Ltd. USA), and 2 parts by weight of 2,6-di-tert-butyl-p-cresol acting as antioxidant. The compound was melted at 180° C. and biaxially oriented polyethylene terephthalate film disposed on a hot plate of 180° C. was coated with the resultant hot-melt pressure sensitive adhesive compound, the coating layer being 40μ thick, so as to obtain an adhesive film. Table 3 also shows the pressure sensitive properties of the adhesive film.

TABLE 3

| | Elastomer | Modifier | Elastomer Component properties | | Pressure Sensitive properties | | |
|---|---|---|---|---|---|---|---|
| | | | rate of grafting (Wt. %) | M.I. | Tackiness (the number of balls) | Adhesion (g/25mm) | Holding power (mm/2hrs.) |
| Example 7 | A-EPR (1) | acrylic acid | 6.4 | 7.0 | 5 | 1720 | 0.1 |
| Example 8 | MTA-EPR (2) | methacrylic | 7.2 | 7.1 | 5 | 1290 | 0.1 |

TABLE 3-continued

| | Elastomer | Modifier | Elastomer Component properties | | Pressure Sensitive properties | | |
| --- | --- | --- | --- | --- | --- | --- | --- |
| | | | rate of grafting (Wt. %) | M.I. | Tackiness (the number of balls) | Adhesion (g/25mm) | Holding power (mm/ 2hrs.) |
| Example 9 | MMA-EPR (3) | acid methyl methacrylate | 1.3 | 6.6 | 5 | 1540 | 0.2 |

Note:
(1) acrylic acid-modified ethylene-propylene copolymer rubber
(2) methacrylic acid-modified ethylene-propylene copolymer rubber
(3) methyl methacrylate-modified ethylene-propylene copolymer rubber

EXAMPLE 10

Reaction mixture 1 containing maleic anhydride-modified ethylene-propylene copolymer rubber was prepared as in Example 3 except that ethylene-propylene copolymer rubber having a melt index of 45 and containing 80 mol % of ethylene units was used as the raw material rubber. 50 ml of reaction mixture 1 was taken aside and the rest thereof was partially esterified with n-butanol. Specifically, a mixture consisting of 100 ml of reaction mixture 1 and 100 ml of n-butanol was kept stirred for 15 hours at 130° C. for the esterification reaction so as to obtain reaction mixture 2.

Each of reaction mixture 1 and reaction mixture 2 was cooled to a room temperature and, then, poured into acetone so as to precipitate the formed polymer, followed by washing the polymer with acetone. The product obtained from reaction mixture 1 was found to be maleic anhydride-modified ethylene-propylene copolymer rubber containing 3.0% by weight of maleic anhydride units. On the other hand, the modified rubber obtained from reaction mixture 2 was found to have been esterified by 30 mol % and was found to have a melt index of 33 g/10 minutes.

Finally, an adhesive film was prepared as in Example 1 except that the partially esterified modified rubber obtained from reaction mixture 2 was used as the elastomer component. The adhesive film was found to have a tackiness of 8 (the number of balls), an adhesion of 1,300 g/25 mm and a holding power of 0.1 mm/2hrs.

EXAMPLE 11

Maleic anhydride-modified ethylene.butene-1 copolymer rubber having a melt index of 10 and containing 2.5% by weight of maleic anhydride units was prepared as in Example 3 except that ethylene.butene-1 copolymer rubber having a melt index of 30 and containing 80 mol % of ethylene units was used as the raw material rubber. Then, an adhesive film was prepared as in Example 1 except that the modified rubber mentioned above was used as the elastomer component. The adhesive film was found to have a tackiness of 12 (the number of balls), an adhesion of 1,500 g/25 mm, and a holding power of 0.1 mm/2hrs.

EXAMPLE 12

Maleic anhydride-modified ethylene-propylene copolymer rubber having a melt index of 0.21 and containing 2.5% by weight of maleic anhydride units was prepared by reacting ethylene-propylene copolymer rubber having a melt index of 16 and containing 80 mol % of ethylene units with maleic anhydride as in Example 3 except that kerosene was used as the solvent and the amount of maleic anhydride was 32.9 g. Then, an adhesive compound and an adhesive film was prepared as in Example 1 except that the modified rubber mentioned above was used as the elastomer component. The adhesive film was found to have a tackiness of 7 (the number of balls), an adhesion of 1,520 g/25 mm and a holding power of 0.1 mm/25 hrs.

Control 5

A reaction vessel having an inner volume of 1 l was charged with 400 g of ethylene-propylene copolymer rubber containing 60 mol % of ethylene units and having a number average molecular weight of 3,000 (not less than, 1,000 of melt index), followed by purging the reaction vessel with nitrogen and subsequently heating the rubber to 160° C. Then, 10 g of maleic anhydride and 1.0 g of ditert-butyl peroxide were separately dripped into the reaction vessel over a period of 4 hours. The mixture was kept stirred for 2 hours after completion of the dripping and, then, the reaction vessel was gradually evacuated to 10 mmHg, which was kept for 2 hours, so as to remove the volatile materials such as the unreacted maleic anhydride and the substances generated by decomposition of the peroxide. The product thus obtained was found to be maleic anhydride-modified ethylene-propylene copolymer rubber containing 2.1% by weight of maleic anhydride units and having not less than 1,000 of melt index.

A pressure sensitive adhesive compound was prepared as in Example 1 except that the modified rubber thus obtained was used as the elastomer component. Further, a biaxially oriented polyethylene terephthalate film was coated with the pressure sensitive adhesive compound as in Example 1 except that the coating was carried out at a room temperature. It was impossible to measure the tackiness and adhesion of the resultant adhesive film, indicating that the tackiness and adhesion were less than 2, (number of balls) and less than 20 g/25 mm, respectively. It was also impossible to measure the holding power of the adhesive film because the film had dropped less than 2 hours later from the stainless steel plate having the film stuck thereto.

EXAMPLE 13

A comparative test was conducted in order to look into the difference in heat resistance between an elastomer component used in this invention and a conventional elastomer of SIS. Specifically, a pressure sensitive adhesive compound was prepared as in Example 1 except that each of the elastomers shown in Table 4, which had been heat-treated or not been heat-treated, was used in place of MAH-EPR-1 used in Example 1. Then, 50 g of the hot-melt compound, housed in a stainless steel beaker having an inner volume of 100 ml, was heated for 6 hours in an air oven maintained at 230° C., followed by cooling the compound to 180° C. Finally, a biaxially oriented polyethylene terephthalate film disposed on a hot plate of 180° C. was coated with the hot-melt compound by using an applicator, the coating layer being 40μ thick, so as to prepare an adhesive film. Table 4 shows the pressure sensitive properties of the adhesive film.

TABLE 4

| Elastomer | Heat Treatment | Pressure Sensitive properties | | |
|---|---|---|---|---|
| | | Tackiness (the number of balls) | Adhesion (g/25mm) | Holding power (mm/2hrs.) |
| SIS* | none | 12 | 2100 | 0.2 |
| MAH-EPR-2** | none | 11 | 2300 | 0.1 |
| MAH-EPR-4*** | none | 6 | 930 | 0.1 |
| SIS* | treated | not more than 2 | 2060 | dropped before 2 hrs. |
| MAH-EPR 2** | treated | 5 | 2420 | 0.1 |
| MAH-EPR-4*** | treated | 5 | 1440 | 0.1 |

*Kraton TR-1107 (see Control 2)
**See Example 2
***MAH-EPR-4 . . . Maleic anhydride-modified ethylene-propylene copolymer rubber having a melt index of 23 and containing 2.5% by weight of maleic anhydride units, which was prepared by modifying as in Example 3 an ethylene-propylene copolymer rubber containing 80.5 mol % ethylene units and having a melt index of 34.

What we claim is:

1. A hot-melt pressure sensitive adhesive compound consisting essentially of:
   (a) 30 to 70% by weight of a modified ethylene.α-olefin copolymer rubber containing from 40 to 85 mol % of ethylene units, having a melt index of 5 to 500 and prepared by grafting an unsaturated carboxylic acid or derivative thereof to an ethylene.α-olefin copolymer rubber or a partial ester of said modified copolymer rubber, and
   (b) 70 to 30% by weight of a tackifier selected from the group consisting of aliphatic, aromatic alicyclic and copolymer type petroleum resins, terpene resin, rosin and cumarone-indene resin.

2. The compound according to claim 1, wherein the α-olefin component of the ethylene.α-olefin copolymer rubber is selected from the group consisting of propylene, 1-butene and 4-methyl-1-pentene.

3. The compound according to claim 1, wherein the α-olefin component of the ethylene.α-olefin copolymer rubber is selected from the group consisting of propylene and 1-butene.

4. The compound according to claim 1, wherein the ethylene.α-olefin copolymer rubber contains at most 0.5 mol % of polyene.

5. The compound according to claim 1, wherein the partial ester of the modified copolymer rubber has at most 80 mol % of esterification rate.

6. The compound according to claim 1, wherein the unsaturated carboxylic acid is an unsaturated dicarboxylic acid.

7. The compound according to claim 1, wherein the unsaturated carboxylic acid is selected from the group consisting of acrylic acid, methacrylic acid, maleic acid, fumaric acid, and itaconic acid.

8. The compound according to claim 1, wherein the unsaturated carboxylic acid derivative is selected from the group consisting of an anhydride, ester, amide, imide and metal salt of an unsaturated carboxylic acid.

9. The compound according to claim 8, wherein the unsaturated carboxylic anhydride is an unsaturated dicarboxylic anhydride.

10. The compound according to claim 9, wherein the unsaturated dicarboxylic anhydride is maleic anhydride.

11. The compound according to claim 1, wherein the modified ethylene.α-olefin copolymer rubber contains 0.01 to 10% by weight of an unsaturated carboxylic acid or derivative thereof grafted thereto.

12. The compound according to claim 1, wherein the aliphatic petroleum resin is selected from the group consisting of a polymer polymerized from a mixture of unsaturated compounds consisting essentially of aliphatic hydrocarbons having a boiling point ranging between −30° C. and +50° C., an acid-modified polymer obtained by modifying said polymer with an acid, and a hydrogenated polymer obtained by hydrogenating said polymer.

13. The compound according to claim 1, wherein the aromatic petroleum resin is selected from the group consisting of a polymer polymerized from a mixture of unsaturated compounds consisting essentially of aromatic hydrocarbons having a boiling point ranging between 100° C. and 300° C., an acid-modified polymer obtained by modifying said polymer with an acid, and a hydrogenated polymer obtained by hydrogenating said polymer.

14. The compound according to claim 1, wherein the terpene resin is selected from the group consisting of a homopolymer of terpenes and a copolymer of terpenes.

15. The compound according to claim 1, wherein the resin is selected from the group consisting of natural rosin, ester of rosin and carboxylic acid-modified rosin.

16. The compound according to claim 1, wherein the tackifier is selected from the group consisting of terpene resin and aliphatic petroleum resin.

17. The compound according to claim 1, which further contains at least one compounding agent selected from the group consisting of a softener, an antioxidant, an ultraviolet absorber and a filler.

18. The compound according to claim 1, wherein the melt index of said ethylene α-olefin copolymer rubber is 10 to 200.

19. The compound according to claim 11, wherein the copolymer rubber contains 1 to 5% by weight of an unsaturated carboxylic acid or derivative grafted thereto.

20. A hot-melt pressure-sensitive adhesive compound consisting essentially of:
   (a) 30 to 70% by weight of a modified ethylenepropylene copolymer rubber containing from 60 to 83 mol % of ethylene units, having a melt index of 10 to 200 and prepared by grafting from 1 to 5% by weight of maleic acid, maleic anhydride, acrylic acid, methacrylic acid or methyl methacrylate onto said ethylene-propylene rubber; and
   (b) from 70 to 30% by weight of a petroleum resin or terpene resin tackifier.

21. The compound according to claim 20, wherein the melt index of said ethylene-propylene rubber is 20-100.

22. The compound according to claim 20, wherein maleic anhydride is grafted onto said ethylene-propylene rubber.

* * * * *